US007286897B2

(12) United States Patent
Liu et al.

(10) Patent No.: US 7,286,897 B2
(45) Date of Patent: Oct. 23, 2007

(54) REAL TIME MONITORING SYSTEM OF SEMICONDUCTOR MANUFACTURING INFORMATION

(75) Inventors: Chih-Pang Liu, Hsin-Chu (TW); Chen-Hsien Ho, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 401 days.

(21) Appl. No.: 10/951,154

(22) Filed: Sep. 27, 2004

(65) Prior Publication Data

US 2006/0070014 A1    Mar. 30, 2006

(51) Int. Cl.
*G06F 19/00* (2006.01)

(52) U.S. Cl. .................. 700/180; 700/108; 707/104.1; 345/418

(58) Field of Classification Search .................. 700/99, 700/100, 108, 121, 180, 182; 707/101, 104.1; 716/11; 483/9; 358/1.15; 382/141; 345/418
See application file for complete search history.

(56) References Cited

U.S. PATENT DOCUMENTS

| 5,297,022 | A | * | 3/1994 | Watanabe ................ 700/86 |
| 5,378,218 | A | * | 1/1995 | Daimaru et al. ............. 483/9 |
| 5,465,215 | A | * | 11/1995 | Strickland et al. .......... 700/180 |
| 5,504,917 | A |   | 4/1996 | Austin |
| 5,904,727 | A |   | 5/1999 | Prabhakaran |
| 5,933,353 | A | * | 8/1999 | Abriam et al. ............. 700/182 |
| 6,253,193 | B1 |  | 6/2001 | Ginter et al. |
| 6,349,237 | B1 |  | 2/2002 | Koren et al. |
| 6,473,794 | B1 |  | 10/2002 | Guheen et al. |
| 6,810,401 | B1 | * | 10/2004 | Thompson et al. ......... 707/101 |
| 6,816,746 | B2 | * | 11/2004 | Bickley et al. ............... 700/99 |
| 6,888,541 | B2 | * | 5/2005 | Morse ........................ 345/419 |
| 6,954,676 | B2 | * | 10/2005 | Dorsch ........................ 700/95 |
| 2003/0160778 | A1 | * | 8/2003 | Morse ........................ 345/419 |
| 2004/0061891 | A1 | * | 4/2004 | Philpot ....................... 358/1.15 |
| 2004/0073576 | A1 | * | 4/2004 | Lindner et al. .......... 707/104.1 |
| 2004/0153437 | A1 | * | 8/2004 | Buchan ........................ 707/1 |
| 2006/0052897 | A1 | * | 3/2006 | Liao ........................... 700/108 |
| 2006/0177119 | A1 | * | 8/2006 | McPheely et al. .......... 382/141 |
| 2006/0202674 | A1 | * | 9/2006 | Long ........................... 324/142 |

FOREIGN PATENT DOCUMENTS

EP       933690 A2 *  8/1999

* cited by examiner

*Primary Examiner*—Leo Picard
*Assistant Examiner*—Sheela Rao
(74) *Attorney, Agent, or Firm*—Haynes and Boone, LLP

(57) ABSTRACT

The present disclosure provides a system for monitoring semiconductor manufacturing in real time which includes an icon module with a database for storing a plurality of icons to provide stored icons that use vector data to represent respective pieces of equipment employed in semiconductor manufacture, a layout module which includes a database for storing information on a layout of a semiconductor manufacturing facility to provide stored information on the layout, and a joiner module, which is receptive to the icon module and the layout module, for using vector data to merge stored icons received from the icon module with stored information on the layout received from the layout module to produce a merged graphical layout of the semiconductor manufacturing facility. Upon merging, the icons are accessible in the merged graphical display to display real time information relating to semiconductor manufacture.

34 Claims, 8 Drawing Sheets

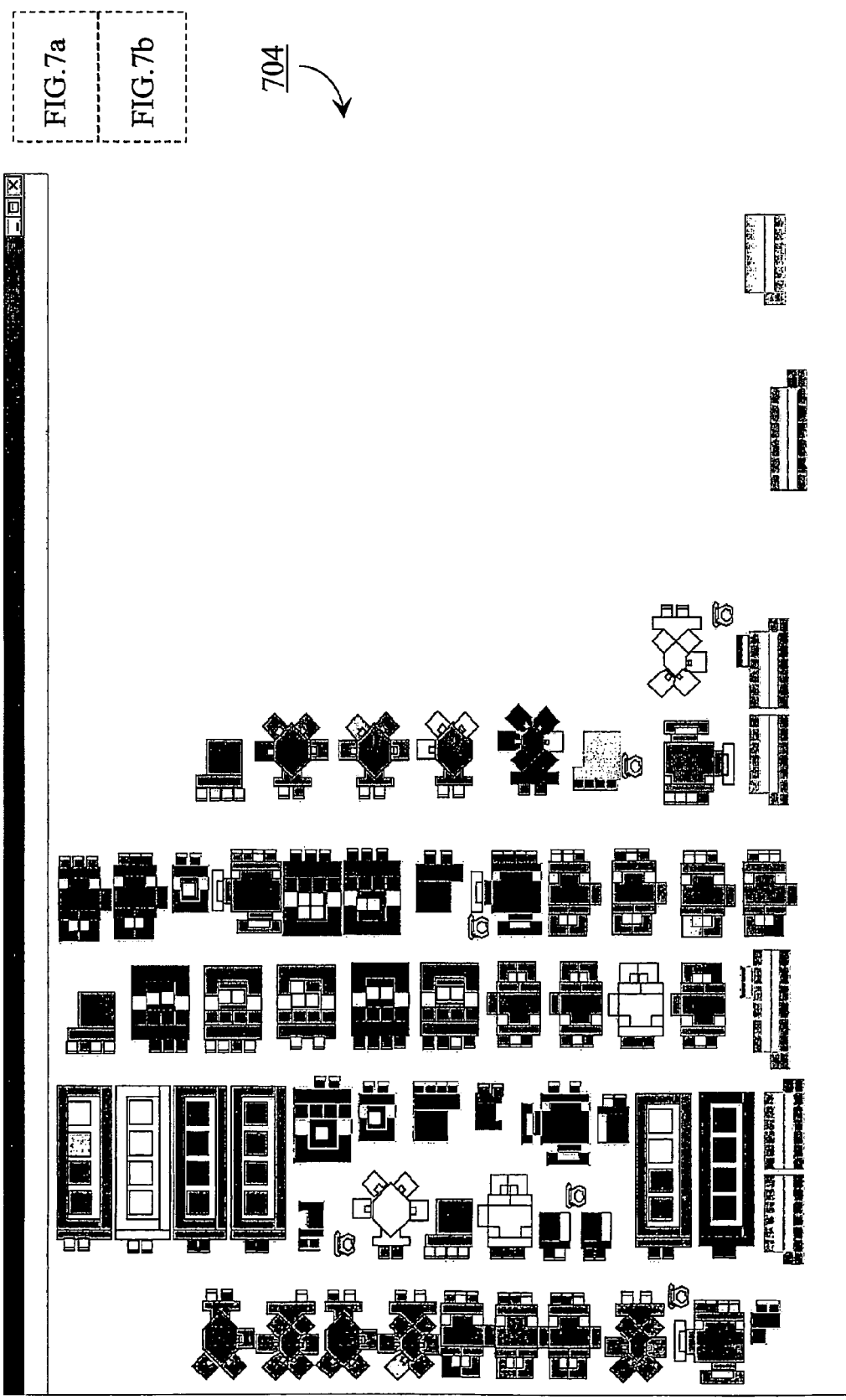

REAL TIME MONITORING SYSTEM OF SEMICONDUCTOR MANUFACTURING INFORMATION

BACKGROUND

The present disclosure relates generally to the field of semiconductor manufacturing and, more particularly, to a real time monitoring system of semiconductor manufacturing information.

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level, the IC's active device density (i.e., the number of devices per IC area) and functional density (i.e., the number of interconnected devices per IC area) has become limited by the fabrication process.

Furthermore, as the IC industry has matured, the various operations needed to produce an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

The complexity of process steps and the time-consuming process of manufacturing advanced semiconductor devices mandates efficient processing systems and methods, specifically in the design, layout, and control of semiconductor fabrication. Layout design systems can be employed for effectively laying out the process equipment and supporting facilities for semiconductor fabrication. A graphical layout system of the manufacturing facility may be further employed for control and monitoring of semiconductor fabrication. The components of the graphical layout may include a vast amount of different components ranging from various process equipment, product stockers and transportation systems, and facilities support equipment which may include gas cylinders, exhaust lines, gas lines, chemical lines, power supplies, and vacuum pumps. The design and layout of all of the components of a manufacturing facility can benefit by proper layout to maximize the efficiency and cost of semiconductor fabrication. The graphical layout of the process equipment can provide an efficient method for control and monitoring of all components of the semiconductor fabrication. However, current graphical design, layout, monitor, and control methods do not provide a simplified system and can generally be slow and un-scalable.

Accordingly, what is needed is a system for monitoring semiconductor manufacturing that addresses the above-discussed issues.

DETAILED DESCRIPTION

Figure 1:
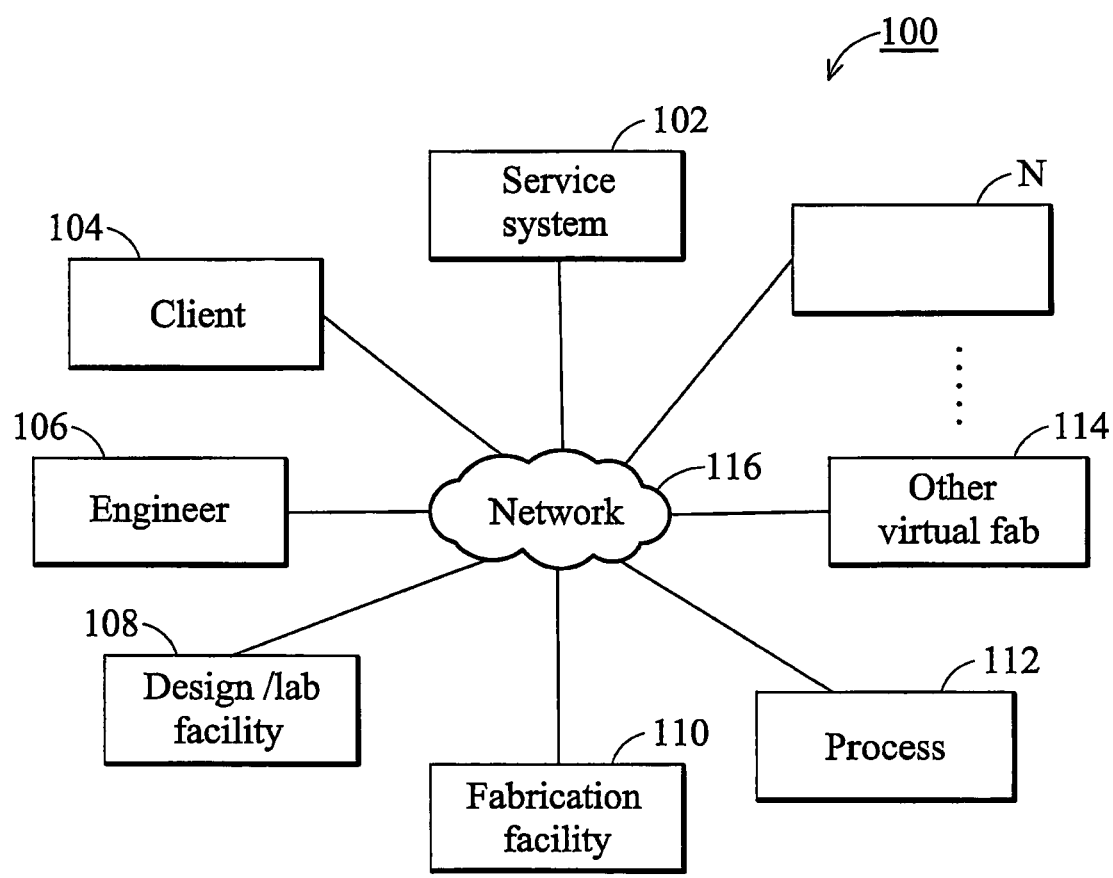
FIG. 1 is a schematic view illustrating an embodiment of a virtual IC fabrication system.

The present disclosure relates generally to the field of semiconductor manufacturing and, more particularly, to a real time monitoring system of semiconductor manufacturing information.

It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, a virtual IC fabrication system (a "virtual fab") 100, includes a plurality of entities 102, 104, 106, 108, 110, 112, 114, . . . , N that are connected by a communications network 116. The network 116 may be a single network or may be a variety of different networks, such as an intranet and the Internet, and may include both wireline and wireless communication channels.

In the present example, entity 102 represents a service system for service collaboration and provision, entity 104 represents a client, entity 106 represents an engineer, entity 108 represents a design/laboratory (lab) facility for IC design and testing, entity 110 represents a fabrication (fab) facility, entity 112 represents a process (e.g., an automated fabrication process), and entity 114 represents another virtual fab (e.g., a virtual fab belonging to a subsidiary or a business partner). Each entity may interact with other entities and may provide services to and/or receive services from the other entities.

For purposes of illustration, each entity 102-112 may be referred to as an internal entity (e.g., an engineer, client service personnel, an automated system process, a design or fabrication facility, etc.) that forms a portion of the virtual fab 100 or may be referred to as an external entity (e.g., a client) that interacts with the virtual fab 100. It is understood that the entities 102-112 may be concentrated at a single location or may be distributed, and that some entities may be incorporated into other entities. In addition, each entity 102-112 may be associated with system identification information that allows access to information within the system to be controlled based upon authority levels associated with each entities identification information.

The virtual fab 100 enables interaction among the entities 102-112 for the purpose of IC manufacturing, as well as the provision of services. In the present example, IC manufacturing includes receiving a client's IC order and the associated operations needed to produce the ordered ICs and send them to the customer, such as the design, fabrication, testing, and shipping of the ICs.

One of the services provided by the virtual fab 100 may enable collaboration and information access in such areas as design, engineering, and logistics. For example, in the design area, the client 104 may be given access to information and tools related to the design of their product via the service system 102. The tools may enable the client 104 to perform yield enhancement analyses, view layout information, and obtain other information. In the engineering area, the engineer 106 may collaborate with other engineers using fabrication information regarding pilot yield runs, risk analysis, quality, and reliability. The logistics area may provide the client 104 with fabrication status, testing results, order handling, and shipping dates. Client 104 could be customers, engineers, or related personnel from other manufacturing site or design house, or even the inside the manufacture. It is understood that these areas are exemplary, and that more or less information may be made available via the virtual fab 100 as desired.

Another service provided by the virtual fab 100 may integrate systems between facilities, such as between the design/lab facility 108 and the fab facility 110. Such integration enables facilities to coordinate their activities. For example, integrating the design/lab facility 108 and the fab facility 110 may enable design information to be incorporated more efficiently into the fabrication process, and may enable data from the fabrication process to be returned to the design/lab facility 108 for evaluation and incorporation into later versions of an IC. The process 112 may represent any process operating within the virtual fab 100.

Figure 2:
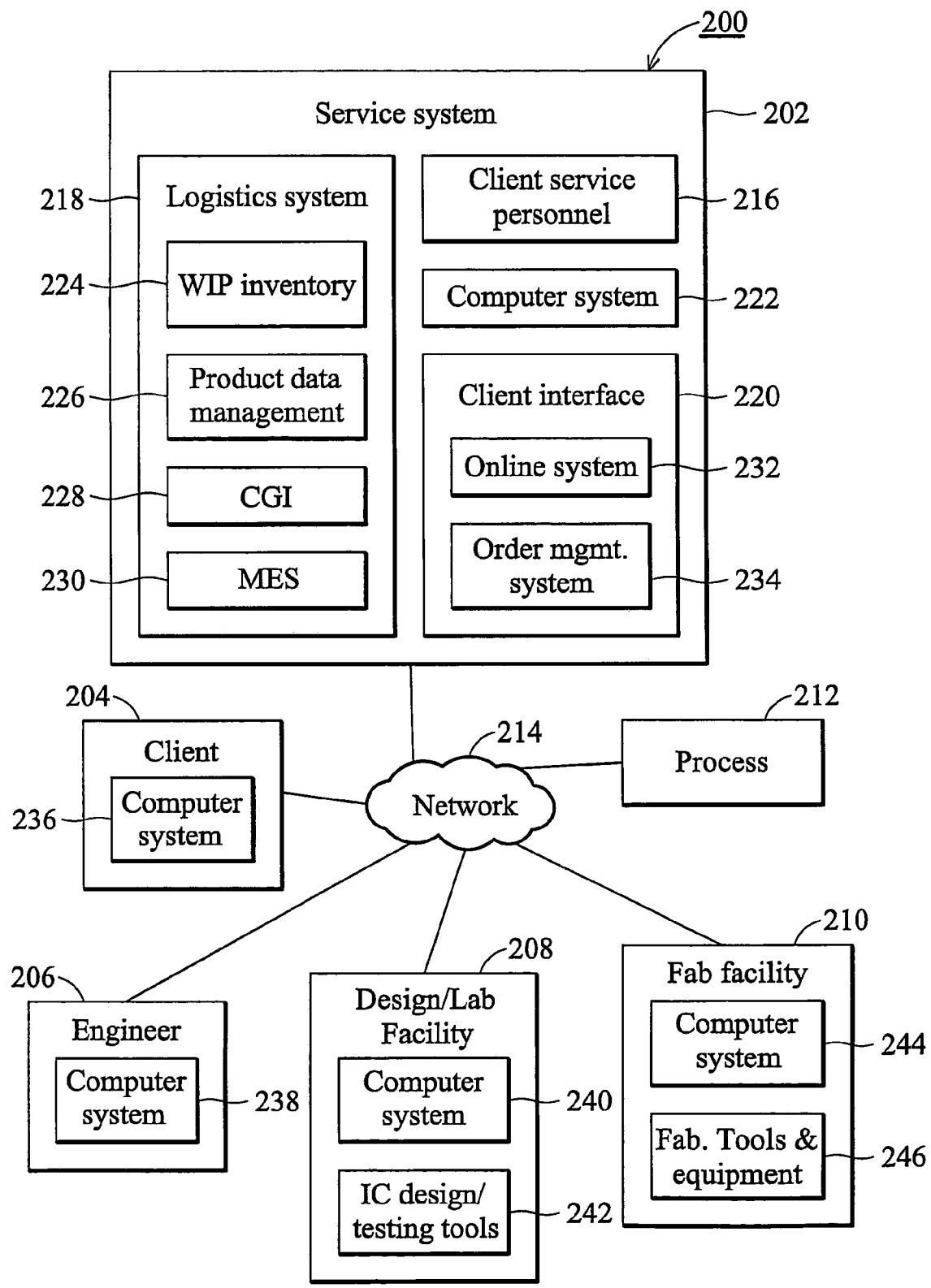
FIG. 2 is a schematic view illustrating another embodiment of a virtual IC fabrication system.

Referring now to FIG. 2, in another embodiment, a virtual fab 200 illustrates one possible implementation of the virtual fab 100 of FIG. 1. The virtual fab 200 includes a plurality of entities 202, 204, 206, 208, 210, and 212 that are connected by a communications network 214. In the present example, entity 202 represents a service system, entity 204 represents a client, entity 206 represents an engineer, entity 208 represents a design/lab facility for IC design and testing, entity 210 represents a fab facility, and entity 212 represents a process (e.g., an automated fabrication process). Each entity may interact with other entities and may provide services to and/or receive services from the other entities.

The service system 202 provides an interface between the client and the IC manufacturing operations. For example, the service system 202 may include client service personnel 216, a logistics system 218 for order handling, manufacturing tracking and information accessing, and a client interface 220 for enabling a client to directly access various aspects of an order.

The logistics system 218 may include a work-in-process (WIP) inventory system 224, a product data management system 226, a common gateway interface (CGI) 228, and a manufacturing execution system (MES) 230. The WIP inventory system 224 may track working lots using a database (not shown). The product data management system 226 may manage product data and maintain a product database (not shown). The product database could include product categories (e.g., part, part numbers, and associated information), as well as a set of process stages that are associated with each category of products. A CGI 228 is a standard interface for external applications with information servers such as Hyper Text Transfer Protocol (HTTP) or Web servers. Other options with the similar functions may include Active Server Page(s) (ASP) which is Microsoft web scripting language and file extension, or Java Server Pages (JSP).

The MES 230 may be an integrated computer system representing the methods and tools used to accomplish production. In the present example, the primary functions of the MES 230 may include collecting data in real time, organizing and storing the data in a centralized database, work order management, workstation management, process management, inventory tracking, and document control. The MES 230 may be connected to other systems both within the service system 202 and outside of the service system 202. Examples of the MES 230 include Promis, Workstream, Poseidon, and Mirl-MES. Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 230 may include such information as a process step sequence for each product.

The client interface 220 may include an online system 232 and an order management system 234. The online system 232 may function as an interface to communicate with the client 204, other systems within the service system 202, supporting databases (not shown), and other entities 206-212. The order management system 234 may manage client orders and may be associated with a supporting database (not shown) to maintain client information and associated order information.

Portions of the service system 202, such as the client interface 220, may be associated with a computer system 222 or may have their own computer systems. In some embodiments, the computer system 222 may include multiple computers, some of which may operate as servers to provide services to the client 204 or other entities. The service system 202 may also provide such services as identification validation and access control, both to prevent unauthorized users from accessing data and to ensure that an authorized client can access only their own data.

The client 204 may obtain information about the manufacturing of its ICs via the virtual fab 200 using a computer system 236. In the present example, the client 204 may access the various entities 202, 206-212 of the virtual fab 200 through the client interface 220 provided by the service system 202. However, in some situations, it may be desirable to enable the client 204 to access other entities without going through the client interface 220. For example, the client 204 may directly access the fab facility 210 to obtain fabrication related data.

The engineer 206 may collaborate in the IC manufacturing process with other entities of the virtual fab 200 using a computer system 238. The virtual fab 200 enables the engineer 206 to collaborate with other engineers and the design/lab facility 208 in IC design and testing, to monitor fabrication processes at the fab facility 210, and to obtain information regarding test runs, yields, etc. In some embodiments, the engineer 206 may communicate directly with the client 204 via the virtual fab 200 to address design issues and other concerns.

The design/lab facility 208 provides IC design and testing services that may be accessed by other entities via the virtual fab 200. The design/lab facility 208 may include a computer system 240 and various IC design and testing tools 242. The IC design and testing tools 242 may include both software and hardware.

The fab facility 210 enables the fabrication of ICs. Control of various aspects of the fabrication process, as well as data collected during the fabrication process, may be accessed via the virtual fab 200. The fab facility 210 may include a computer system 244 and various fabrication hardware and software tools and equipment 246. For example, the fab facility 210 may include an ion implantation tool, a chemical vapor deposition tool, a thermal oxidation tool, a sputtering tool, and various optical imaging systems, as well as the software needed to control these components.

The process 212 may represent any process or operation that occurs within the virtual fab 200. For example, the process 212 may be an order process that receives an IC order from the client 204 via the service system 202, a fabrication process that runs within the fab facility 210, a design process executed by the engineer 206 using the design/lab facility 208, or a communications protocol that facilities communications between the various entities 202-212.

It is understood that the entities 202-212 of the virtual fab 200, as well as their described interconnections, are for purposes of illustration only. For example, it is envisioned that more or fewer entities, both internal and external, may exist within the virtual fab 200, and that some entities may be incorporated into other entities or distributed. For example, the service system 202 may be distributed among the various entities 206-210.

Figure 3:
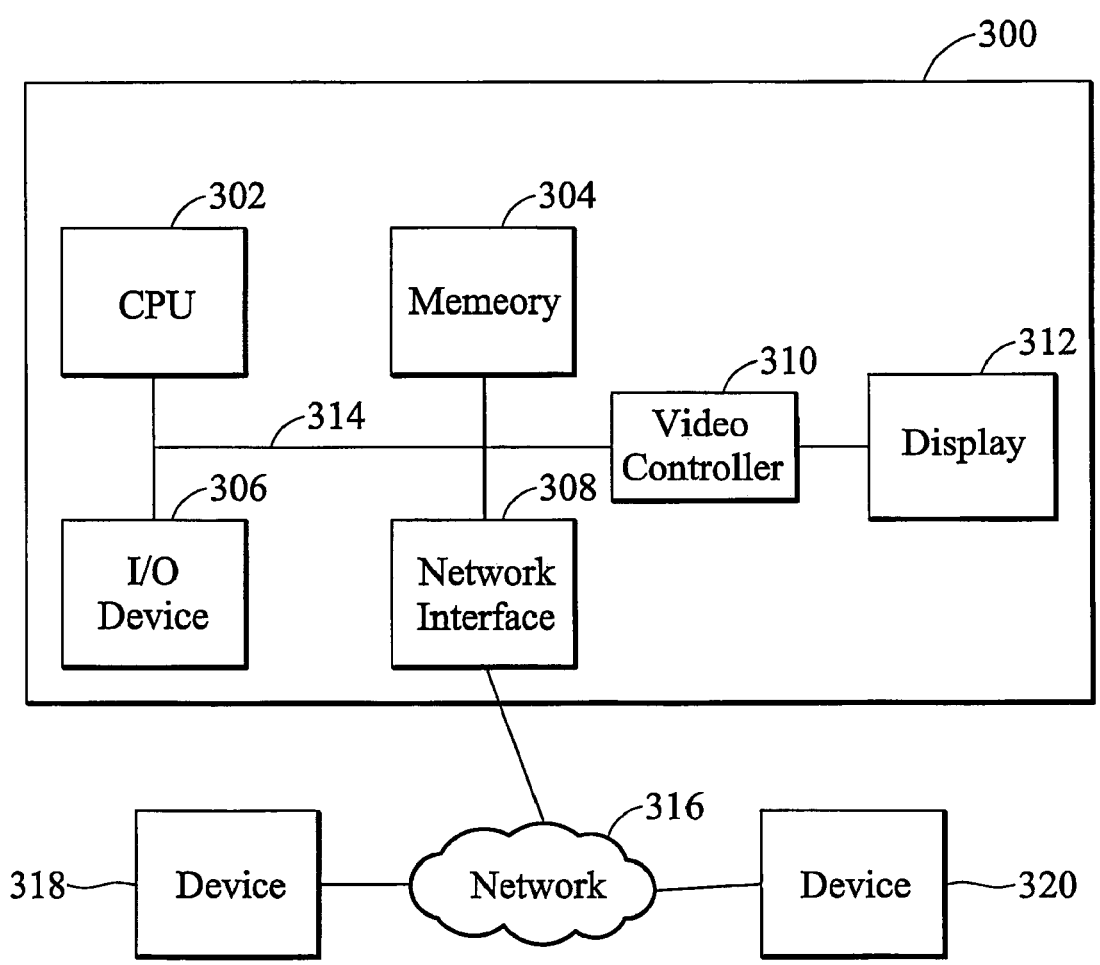
FIG. 3 is a schematic view illustrating an embodiment of a computer system which may be used within a virtual IC fabrication system.

Referring now to FIG. 3, an exemplary computer 300, such as may be used within the virtual fab 100 of FIG. 1 or virtual fab 200 of FIG. 2, is illustrated. More particularly, computer system 300 can be used as computer systems 222, 236, 238, 240, and 244 in FIG. 2. The computer 300 may include a central processing unit (CPU) 302, a memory unit 304, an input/output (I/O) device 306, a network interface 308, and a video controller 310 coupled to a display 312. The network interface 308 may be, for example, one or more network interface cards (NICs). The components 302, 304, 306, 308, 310, and 312 are interconnected by a bus system 314. It is understood that the computer may be differently configured and that each of the listed components may actually represent several different components. For example, the CPU 302 may actually represent a multi-processor or a distributed processing system; the memory unit 304 may include different levels of cache memory, main memory, hard disks, and remote storage locations; the I/O device 306 may include monitors, printer, keyboards, and the like, and display 312 may include a display or a plurality of displays.

The computer 300 may be connected to a network 316, which may be connected to the networks 116 (FIG. 1) or 214 (FIG. 2). The network 316 may be, for example, a complete network or a subnet of a local area network (LAN), a company wide intranet, and/or the Internet. The computer 300 may be identified on the network 316 by an address or a combination of addresses, such as a media control access (MAC) address associated with the network interface 308 and an internet protocol (IP) address. Because the computer 300 may be connected to the network 316, certain components may, at times, be shared with other devices 318 and 320. Therefore, a wide range of flexibility is anticipated in the configuration of the computer. Furthermore, it is understood that, in some implementations, the computer 300 may act as a server to other devices 318, 320. The devices 318, 320 may be computers, personal digital assistants (PDA), wired or cellular telephones, or any other device able to communicate with the computer 300.

Figure 4:
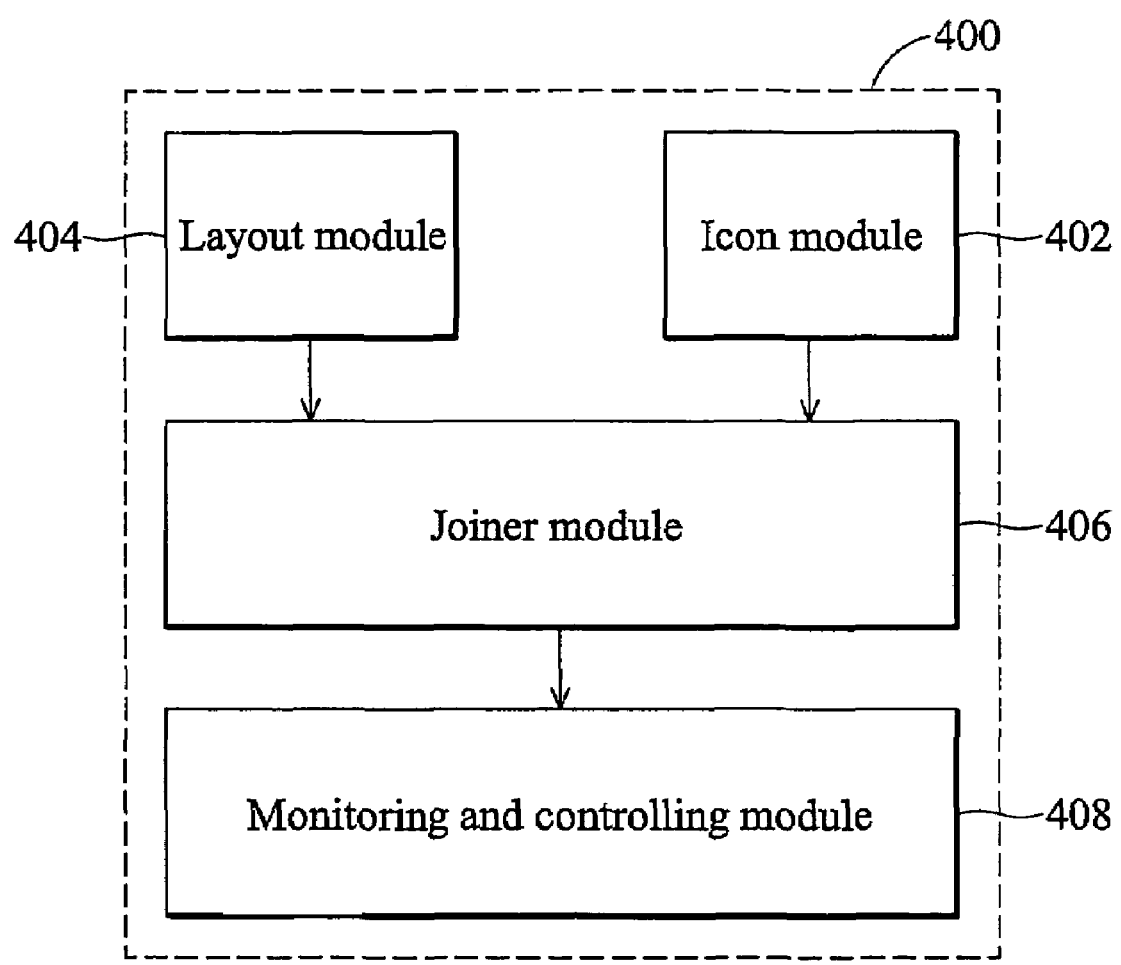
FIG. 4 is a schematic view illustrating an embodiment of a real time semiconductor fabrication monitoring system.

Referring to FIG. 4, a schematic view illustrates an embodiment of a real time semiconductor manufacturing monitoring system 400. The system 400 may include a plurality of modules including an icon module 402, a layout module 404, a joiner module 406, and a monitoring and controlling module 408. The system may exist within or be coupled to a virtual fab such as the virtual fab 100 of FIG. 1 or the virtual fab 200 of FIG. 2. Icon module 402 may include a library housing a plurality of icons, any one of which may represent any respective piece of manufacturing equipment that may be utilized in semiconductor fabrication and used to build a graphical representation of a manufacturing facility. The icons may have the ability to display information in the graphical representation of the manufacturing facility including information on the process equipment, process recipes, works in progress, alarms, and equipment history. Vector data, which may include a vector or a plurality of vectors, may be associated with each icon, where the vector data may define the position, shape, magnitude, and various other parameters of the icon and the location of the icon in the library. The icon module 402 may further include icon generators for creating icons which will correspond to particular pieces of fabrication equipment, and icon editors for changing icons when the piece of equipment corresponding to an icon is modified. Layout module 404 may include layout information on a plurality of manufacturing executing systems (MESs), such as the MES 230 of FIG. 2. The layout information may include the layout parameters for an individual semiconductor fabrication or multiple semiconductor fabrications, positioning coordinates for pieces of equipment used in the semiconductor fabrication, layout identifications for the semiconductor fabrication, and icon identifications for pieces of equipment in the semiconductor fabrication. The layout module 404 may also include a layout generator for creating new layouts and a layout editor for modifying layouts. A joiner module 406 may be coupled to both the icon module 402 and the layout module 404 and is used for merging icons with their corresponding layouts in order to create a merged graphical layout of the semiconductor manufacturing facility. Monitoring and controlling module 408 may receive the merged graphical layout from joiner module 406 and, in one embodiment, can be used to monitor the semiconductor manufacturing facility through the icons in the layout.

Figure 5:
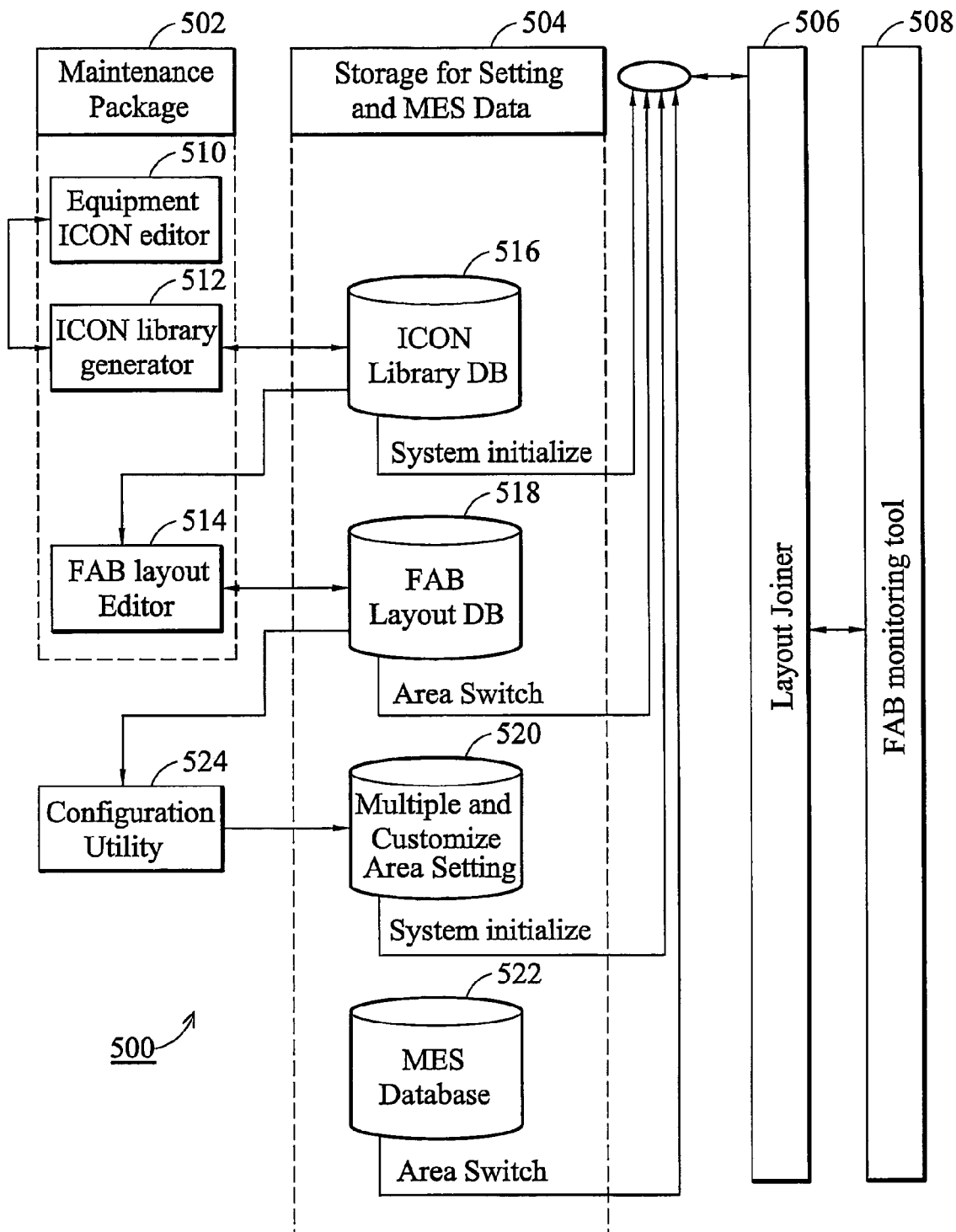
FIG. 5 is a schematic view illustrating an embodiment of a method for fast layout of a real time semiconductor fabrication monitoring system.

Referring now to FIG. 5, a schematic view illustrates an embodiment of a method for fast layout 500 for graphical layouts of semiconductor MESs within a virtual fab, such as virtual fab 100 of FIG. 1 or virtual fab 200 of FIG. 2. The method 500 may include a plurality of components including a system maintenance package 502, a storage and settings component 504, a layout joiner 506, and a fabrication monitoring tool 508 which may exist within the virtual fab and perform functions for a real time semiconductor manufacturing monitoring system, such as the system 400 of FIG. 4.

System maintenance package 502 may include an equipment icon editor 510, an icon library generator 512, and a fab layout editor 514. Equipment icon editor 510 may be used for creating or modifying graphical icons that represent semiconductor process equipment by methods known in the art. Equipment icon editor 510 may also assign information to icons including vector data. Vector data may be used to define any information associated with an icon, and a plurality of dynamic and static variables may be included as part of the icon. The equipment icon editor 510 may be coupled to or incorporated with an icon library generator 512 where basic icons associated with process equipment may be created. The icon library generator 512 may generate a plurality of icons which may be used and modified by the equipment icon generator 510 in assigning an icon to a piece of processing equipment. Fab layout editor 514 can retrieve icons from the icon library database 516 and assign vector data to the icons for layout placement. Fab layout editor 516 may also assign the icons other information associated with the process equipment and may provide dynamic variables to each icon for process equipment variables that may be viewed in real-time. Fab layout editor may further create and modify layout data relating to semiconductor fabrication and of MESs.

Storage and settings component 504 may include a plurality of databases 516-522 which may exist in a virtual fab environment such as the virtual fab 100 of FIG. 1 or the virtual fab 200 of FIG. 2. The plurality of databases may include an icon library database 516, a fab layout database 518, a multiple and customized area setting database 520, and a MES database 522 may be included. Icon library database 516 may include a plurality of icons that may be created by the equipment icon editor 510 and the icon library generator 512, and may be accessed by the icon library generator to transmit icons. The icon library database 516 may further be accessed by the fab layout editor 514 to transmit icons stored in it. The fab layout database 518 may receive layout data from the fab layout editor 514 and may be accessed by the fab layout editor 514 to transmit layout data stored therein. Multiple and customized area setting database 520 may interact with a configuration utility 524 to provide customization to the layout transmitted from fab layout database 518 to the configuration utility 524. Customization may include adding any process or equipment related information or any information that may provide additional features to the graphical layout, including multiple information screens where a user may obtain any information on the process or equipment or may modify a icon based on changes in the equipment or layout. MES database 522 may contain all information relating to the processes, equipment, facilities, and other components of the fabrication which may be accessed through or utilized in a graphical layout.

All the databases in storage and settings component 504 may then transfer their data to layout joiner 506. The layout joiner 506 may provide the final merging of the icon data and layout data into a dynamic monitoring and control system for semiconductor fabrication. The layout produced by the layout joiner can be monitored and controlled by fab monitoring tool 508, which may reside in an MES in a virtual fab, such as the virtual fab 100 or FIG. 1 or the virtual fab 200 of FIG. 2.

Figure 6:
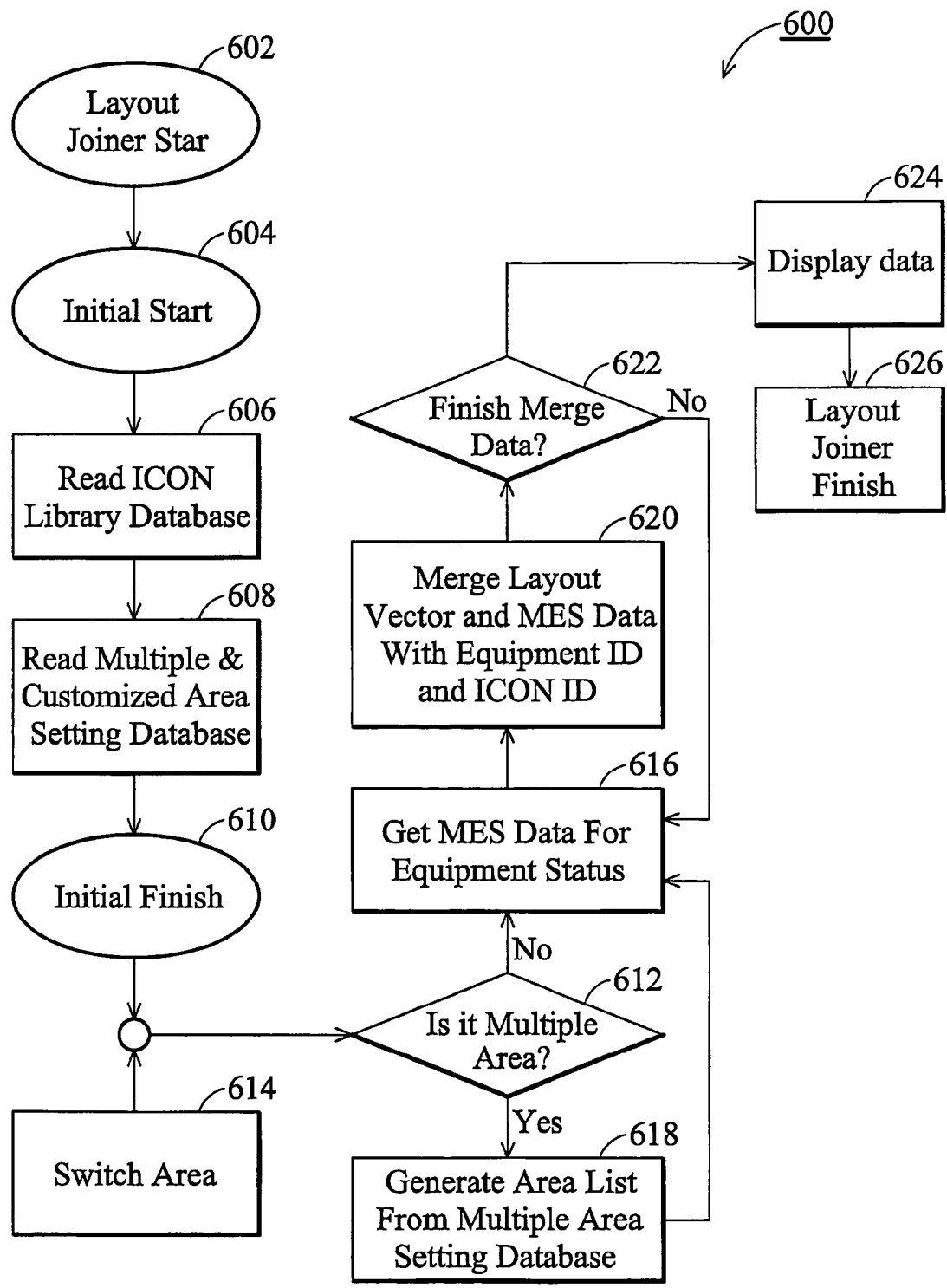
FIG. 6 is a flowchart illustrating a method for creating a layout in a semiconductor fabrication monitoring system.

Referring now to FIG. 5 and FIG. 6, a flowchart illustrates a method 600 for the operation of the layout joiner 506. The layout joiner 506 may start the joining process at block 602 by system initializing. At block 606 the layout joiner 506 reads the icon library database 516 and at block 608 the layout joiner 506 reads the multiple and customized area setting database 520 in order to construct an initial layout at block 610. This layout may include a specified area such as a process area, a fabrication area, a test area, or any other area that may include the grouping of any processes or process equipment.

Once an initial layout has been constructed upon system initialization, method 600 may proceed to decision block 612 to determine whether there are multiple areas in the layout being constructed. An area is the physical group of similar purpose processing equipment such as, for example, an etch area containing all the etching process related equipment or a photo area containing all the photolithography process related equipment. The system 400 may use an area as a monitoring base, and a user may monitor specific areas or multiple areas base on a job assignment. Decision block 612 may also be reached in response to an area switch at block 614 after system initialization. The operation of changing areas such as, for example, an etch area to a photo area, is called an area switch. If there are not multiple areas, the method 600 proceeds to block 616 where the layout joiner 506 reads the MES database 522 to retrieve vector data on the equipment in the layout. If there are multiple areas, then layout joiner 506 will generate a list of areas from the multiple area settings database at block 618. The system 400 provides the capability to logically combine multiple areas and display the combination on one screen. A user may customize the combination in order to maximize the usability of the system 400. The system 400 will store this combination, which consists of single area ids. After an area switch, the system 400 will check first whether the switch target is multiple or single area. If it's multiple area, system 400 gets the combination configured by user and processes the areas to fit into one computer screen. Once the list of areas is generated, the layout joiner 506 will read the MES database 522 to retrieve data on the status of the equipment in the different areas of the layout. At block 620, the layout joiner 506 will merge the layout vector data and the MES data with the equipment and icon identification.

Once the layout vector data and MES data have been merged with the equipment and icon identification, the method proceeds to decision block 622 where the layout joiner 506 determines whether all the data has been merged by references flags in the area layout setting. If the data has not all been merged, the method 600 returns to block 616 to retrieve additional MES data from MES database 522 and conduct a merge until the data is merged and the layout is finished.

Once the data has all been merged, the data may be sent to be displayed through a graphical interface on the fab monitoring tool 508 at block 624. Once this is done, the layout joiner 506 is finished at block 626.

Figure 7B:
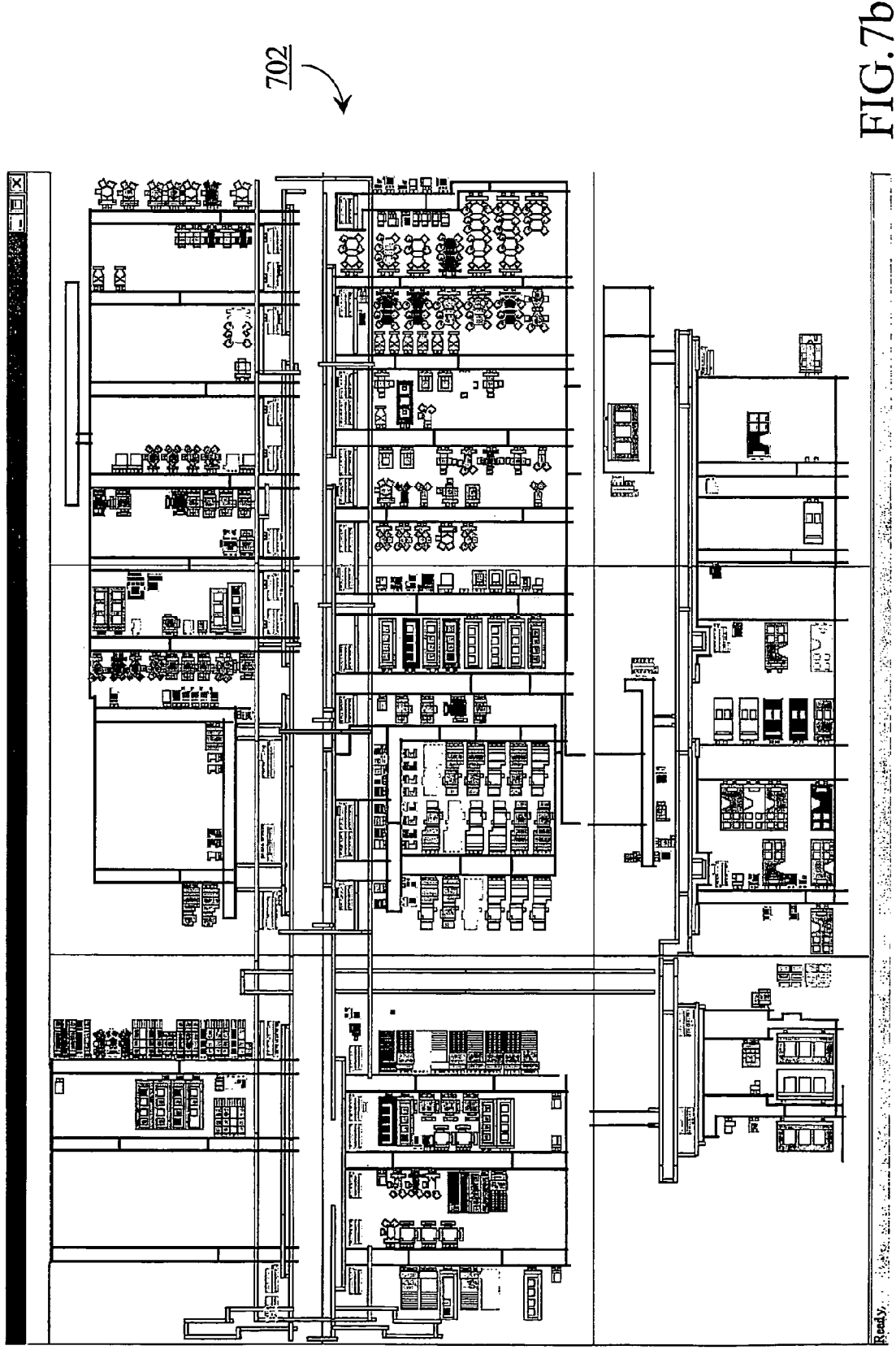
FIG. 7 is a screenshot view illustrating the equipment icons in a layout.

Referring now to FIG. 7, illustrated are screenshots 700 and 702 of the equipment icons in a layout. Screenshot 700 shows four partitioned windows 704, 706, 708, and 710 which may represent different process areas within a single semiconductor manufacturing facility or may represent multiple areas with different semiconductor manufacturing facilities. The areas may correspond to different process areas within the semiconductor manufacturing facility such as a thin films area, a lithography area, an etching area, a diffusion area, a metrology area, and an electrical testing area. The screenshot 700 further illustrates that equipment icons may be grouped into a cluster 712 that may be easily transferred to other areas on the graphical interface while retaining all vector data, icon, and other information about the manufacturing facility. Screenshot 702 illustrates a macroscopic view of a semiconductor manufacturing facility wherein facility gas lines, power lines, exhaust lines, and wafer stocker transfer lines may be viewed. All components of the semiconductor manufacturing facility may be controlled and monitored by the embodiments of this disclosure.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A system for monitoring semiconductor manufacturing in real time comprising a user interface and a services system, the services system for providing real time information to the user interface, the user interface comprising:
an icon module that includes a database for storing a plurality of icons to provide stored icons that use vector data to represent respective pieces of equipment employed in semiconductor manufacture;
a layout module that includes a database for storing information on to a layout of a semiconductor manufacturing facility to provide stored information on the layout; and
a joiner module, receptive to the icon module and the layout module, for using vector data to merge stored icons received from the icon module with stored information on the layout received from the layout module to produce a merged graphical layout of the semiconductor manufacturing facility;
wherein, upon merging, the icons are accessible to display real time information relating to semiconductor manufacture.

2. The system of claim 1 wherein the icon module is used for creating icons that use vector data to represent respective pieces of equipment employed in semiconductor manufacture.

3. The system of claim 1 wherein the icon module is used for modifying icons that use vector data to represent respective pieces of equipment employed in semiconductor manufacture.

4. The system of claim 1 wherein the stored information on the layout of a semiconductor manufacturing facility, includes icon positioning within the layout.

5. The system of claim 1 wherein the layout module is used for creating and modifying information on a layout of a semiconductor manufacturing facility.

6. The system of claim 1 wherein the information on the layout of the semiconductor manufacturing facility includes information regarding connections between icons that represent respective pieces of equipment employed in semiconductor manufacture.

7. The system of claim 1 wherein the joiner module provides scalar data for icon vector data before merging stored icons with stored information on the layout.

8. The system of claim 1 wherein the real time information related to semiconductor manufacture which is accessible from the icons includes a status of the respective piece of equipment that the icon represents.

9. The system of claim 1 wherein the real time information related to semiconductor manufacture which is accessible from the icons includes maintenance information regarding the respective piece of equipment that the icon represents.

10. The system of claim 1 wherein the real time information relating to semiconductor manufacture which is accessible from the icons includes dynamic registers that show process variables in real time.

11. The system of claim 1 wherein the real time information relating to semiconductor manufacture which is accessible from the icons includes operational specifications of the respective piece of equipment that the icon represents.

12. The system of claim 1 wherein the real time information about the semiconductor manufacture which is accessible from the icons includes process recipes.

13. The system of claim 1 further comprising:
a fabrication monitoring tool for monitoring the semiconductor manufacturing facility through the merged graphical layout produced by the joiner module.

14. The system of claim 13 wherein the fabrication monitoring tool is used to control the semiconductor manufacturing facility through the merged graphical layout produced by the joiner module.

15. The system of claim 1 further comprising:
a virtual integrated circuit fabrication system coupled to the system for monitoring semiconductor manufacturing in real time.

16. A system for monitoring semiconductor manufacturing in real time comprising:
a maintenance package to create and edit icons that represent respective pieces of equipment employed in semiconductor manufacture and to create and edit information on a layout of a semiconductor manufacturing facility;
a storage and settings component operable to store and provide icons and information on a layout for a semiconductor manufacturing facility;
a system operable to provide real time information relating to semiconductor manufacture;
a layout joiner, receptive to the storage and settings component, operable to merge stored icons with stored information to produce a merged representation of the semiconductor manufacturing facility, wherein upon merging, the merged representation is accessible to display real time information relating to semiconductor manufacture; and
a fabrication monitoring tool for monitoring the semiconductor manufacturing facility through the merged graphical layout produced by the layout joiner.

17. The system of claim 16 wherein the stored information on the layout includes icon positioning within the layout.

18. The system of claim 16 wherein the stored information on the layout includes information regarding connections between icons that represent respective pieces of equipment employed in semiconductor manufacture.

19. The system of claim 16 wherein the layout joiner provides scalar data for icon vector data before merging stored icons with stored layouts.

20. The system of claim 16 wherein the real time information related to semiconductor manufacture which is accessible from the icons includes a status of the respective piece of equipment that the icon represents.

21. The system of claim 16 wherein the real time information related to semiconductor manufacture which is accessible from the icons includes maintenance information on the respective piece of equipment that the icon represents.

22. The system of claim 16 wherein the real time information related to semiconductor manufacture which is accessible from the icons includes dynamic registers that show process variables in real time.

23. The system of claim 16 wherein the real time information related to semiconductor manufacture which is accessible from the icons includes operational specifications of the respective piece of equipment that the icon represents.

24. The system of claim 16 wherein the real time information about the semiconductor manufacture which is accessible from the icons includes process recipes.

25. The system of claim 16 wherein the fabrication monitoring tool is used to control the semiconductor manufacturing facility through the merged representation produced by the joiner module.

26. The system of claim 16 further comprising:
a virtual integrated circuit fabrication system coupled to the system for monitoring semiconductor manufacturing in real time.

27. A method for monitoring semiconductor manufacturing in real time comprising:
storing a plurality of icons that represent respective pieces of equipment employed in semiconductor manufacture;
storing information on a layout of a semiconductor manufacturing facility;
merging the stored icons with the stored information on the layout to produce a merged representation of the semiconductor manufacturing facility;
providing real time information relating to semiconductor manufacturing to the merged representation; and
accessing the icons to display the real time information relating to semiconductor manufacture.

28. The method of claim 27 further comprising:
creating at least one icon to represent a respective piece of equipment employed in semiconductor manufacture and storing it in a database.

29. The method of claim 27 further comprising:
editing at least one icon to represent a respective piece of equipment employed in semiconductor manufacture and storing it in a database.

30. The method of claim 29 wherein the stored information on the layout includes icon positioning within the layout.

31. The method of claim 27 further comprising:
creating information on a layout of a semiconductor manufacturing facility and storing it in a database.

32. The method of claim 27 further comprising:
editing information on a layout of a semiconductor manufacturing facility and storing it in a database.

33. The method of claim 27 further comprising:
monitoring the semiconductor manufacturing facility through the merged graphical layout.

34. The method of claim 28 further comprising:
controlling the semiconductor manufacturing facility through the merged graphical layout.

* * * * *